(12) United States Patent
Jamieson

(10) Patent No.: US 8,919,803 B2
(45) Date of Patent: Dec. 30, 2014

(54) AUTOMATED AXLE STEERING CONTROL SYSTEM

(71) Applicant: Joseph P. Jamieson, Aubrey, TX (US)

(72) Inventor: Joseph P. Jamieson, Aubrey, TX (US)

( * ) Notice: Subject to any disclaimer, the term of this patent is extended or adjusted under 35 U.S.C. 154(b) by 0 days.

(21) Appl. No.: 13/986,056

(22) Filed: Mar. 28, 2013

(65) Prior Publication Data
US 2014/0291962 A1 Oct. 2, 2014

(51) Int. Cl.
B62D 53/08 (2006.01)
B62D 63/06 (2006.01)
B62D 13/04 (2006.01)

(52) U.S. Cl.
CPC .......... B62D 63/065 (2013.01); *B62D 53/0864* (2013.01); *B62D 13/04* (2013.01)
USPC ...................... 280/476.1; 280/442; 280/441.2

(58) Field of Classification Search
CPC ............................ B62D 53/0864; B62D 13/04
USPC .................................... 280/476.1, 442, 441.2
See application file for complete search history.

(56) References Cited

U.S. PATENT DOCUMENTS

| | | | | |
|---|---|---|---|---|
| 2,929,642 | A * | 3/1960 | Dinkel ........................... | 280/443 |
| 4,451,058 | A * | 5/1984 | Curry ........................ | 280/476.1 |
| 4,759,563 | A * | 7/1988 | Nash ........................... | 280/476.1 |
| 4,768,802 | A * | 9/1988 | Winkler ........................ | 280/408 |
| 5,067,741 | A * | 11/1991 | Ayme ............................ | 280/419 |
| 5,244,226 | A * | 9/1993 | Bergh ............................ | 280/442 |
| 6,290,248 | B1 * | 9/2001 | Yrigoyen ..................... | 280/476.1 |
| 2004/0084874 | A1 * | 5/2004 | McDougall et al. ....... | 280/441.2 |
| 2006/0076754 | A1 * | 4/2006 | Jamieson ................... | 280/476.1 |
| 2009/0020983 | A1 * | 1/2009 | Broemeling ............... | 280/476.1 |
| 2010/0194074 | A1 * | 8/2010 | Jamieson ................... | 280/441.2 |

* cited by examiner

*Primary Examiner* — Joseph M Rocca
*Assistant Examiner* — Marlon Arce
(74) *Attorney, Agent, or Firm* — David G. Moore

(57) ABSTRACT

The invention disclosed herein is a new steering control mechanism attached to a truck frame extension which permits trucks towing goose neck trailers to have more maneuverability while towing the trailer. Specifically, a steering control plate rests between two metal stops located on a tie rod connecting the two wheels of the truck frame extension. When the operator of the truck signals a turn the steering control plate is lifted off of the tie rod to a level above the metal stops which permits the tie rod to move in connection with the movement of the towing truck. After the truck completes the turn the steering control plate returns to rest on the tie rod between the two metal blocks locking the tie rod in place. This arrangement permits the trailer to faithfully follow the truck in straight line traffic. The invention disclosed herein permits the goose neck trailer to make sharper turns without putting stress on the tires and frame of the truck or trailer.

2 Claims, 11 Drawing Sheets

AUTOMATED AXLE STEERING CONTROL SYSTEM

CROSS-REFERENCE TO RELATED APPLICATIONS

This application seeks priority to and benefit of U.S. Provisional Patent Application No. 61/686,039 filed on Mar. 29, 2012 and which is incorporated herein as if fully set forth.

STATEMENT REGARDING FEDERALLY SPONSORED RESEARCH OR DEVELOPMENT

No part of the invention disclosed herein was the subject of federally sponsored research or development.

THE NAMES OF THE PARTIES TO A JOINT RESEARCH AGREEMENT

None

REFERENCE TO A SEQUENCE LISTING

Not applicable.

BACKGROUND OF THE INVENTION

1. Field

The field of the invention disclosed herein is a steering mechanism for a gooseneck trailer which may be towed behind a truck or other vehicle.

2. Description of the Prior Art

Trailers have been developed and used for many years to enable relatively large amounts of goods and materials to be transported from one place to another. Initially, trailers were pulled by humans and later by animals such as horses, cattle or oxen. Today, trailers are pulled by motor powered vehicles such as trucks, sport utility vehicles, and automobiles. With the advent of gasoline and diesel engines, trailers became larger and heavier and could transport more goods faster than if the trailer was pulled by humans or animals.

Trailers have taken a variety of sizes and shapes. There are big rectangular trailers pulled behind powerful tractors, smaller trailers adapted to be pulled by smaller trucks and pickups and yet smaller trailers which can easily be pulled by an automobile. In addition to being diverse in size and shape, trailers are also diverse in the method used to connect the trailer to the towing vehicle. As shown in FIG. 1a (prior art) one popular method is to mount a ball hitch on a receiver attached to the towing vehicle. The tongue of the trailer is equipped with a complementary coupling mechanism which fits over the ball hitch and locks in to place. For extra security, chains are attached to the tongue of the trailer and are connected to the bumper or frame of the towing vehicle. Other trailers are connected to a pickup truck by a so-called "gooseneck" which is so configured to extend out front of the trailer and is connected to the pickup truck by a receiver hitch attached to the floor of the pickup bed as shown in FIG. 1b (prior art). So-called gooseneck trailers have become popular in agricultural and ranching applications. A gooseneck trailer can be configured so as to transport livestock such as horses and cattle from one pasture to another or to market. Gooseneck trailers can also be used to haul hay and feed for the animals. Still other gooseneck trailers can be used to haul sand and gravel and other materials and goods.

Despite their popularity, problems exist with towing the gooseneck trailer. Since the gooseneck trailer is hitched to the bed of the pickup truck, the gooseneck trailer is dependent on the pickup truck for steering and to some extent, braking. In making a sharp turn in a pickup pulling a gooseneck trailer, the pickup must swing out wide so that the trailer can safely make the turn without taking out fire hydrants, telephone poles, signs and the like which may be located on the corner in which the pickup truck is turning. Further, since gooseneck trailers attached to pickups may travel at much higher speeds than their animal-pulled ancestors, braking may be difficult even if the gooseneck trailer is equipped with brakes, especially if the gooseneck trailer is heavily loaded. Another problem is that the hitch located in the bed of the pickup truck takes up valuable space even when the gooseneck trailer is not connected to the pickup truck. What is needed in the art is an apparatus to ease turning, maneuvering, controlling and braking of gooseneck trailers pulled by pickup trucks.

BRIEF DESCRIPTION OF THE INVENTION

The invention disclosed herein is an apparatus to enhance turning, maneuvering, controlling and braking of gooseneck trailers pulled by pickup trucks. Specifically, the invention disclosed herein consists of a truck frame extension which is attached to the pickup truck and is composed of a rectangular frame, axle two wheels, steering control mechanism and receiver hitch to hold the gooseneck trailer hitch. The steering control mechanism is controlled by the turn signal indicator lever located in the cab of the pickup truck. The term "steering control mechanism is used interchangeably with "steering release mechanism" and describes the same feature of the invention. When the turn signal indicator is in the neutral position, the two wheels on the truck frame extension are locked into place. When the driver of the pickup truck indicates a right turn by pushing the turn signal lever accordingly, the tires on the truck frame extension are released and pivot to the left guided by the momentum of the rear of the pickup truck enabling a smooth turn of the gooseneck trailer to the right. The two tires on the truck frame extension remain free to move in conjunction with the rear of the pickup truck. As the towing vehicle moves into the turn, the tires on the truck frame extension pivot into the direction of the turn. When the turn is completed, the turn signal lever has returned to the neutral setting and the tires mounted on the truck frame extension are centered and locked into place. Likewise, when the driver signals a left hand turn, the steering locking mechanism is released which allows the pivoting of the tires on the truck frame extension to the right so that the trailer will smoothly follow the pickup truck in the left-hand turn. As the towing vehicle moves into the turn, the tires on the truck frame extension pivot into the direction of the turn. When the turn is completed, the turn signal lever has returned to the neutral position and the tires mounted on the truck frame extension have centered and locked in place to assure that the gooseneck trailer will follow the pickup truck faithfully in straight line traffic. As a safety feature, the steering locking mechanism will remain engaged for 7-8 flashes of the turn signal indicator. This feature is added so that the driver can safely change lanes without the steering locking mechanism becoming disengaged. This mechanism allows the pickup truck to make a smaller turning radius and is safer than the traditional hitch mechanism. This mechanism also prevents scuffing of the axle tires and decreases side loading on the main frame of the towing vehicle to which it is connected.

The steering release mechanism on the truck frame extension is controlled by an actuator control. The actuator control consists of electrical circuits which sense the activation of the turn signal indicator lights and the actuator on the steering locking mechanism on the truck frame extension. The actuator control also consists of a number of status lights which show that the wheels are either locked in place or free to pivot to the right or left. When the turn signal indicator lever is moved to indicate a right turn, an electric signal is sent from the actuator control to the actuator which causes a piston to compress, raising a steering plate from the tie rod connecting the two wheels. When the wheels are locked, the steering plate rests on the tie rod between two metal stops which prevent the tie rod from moving either left or right. When the actuator compresses the piston the steering plate is lifted to a position where the steering plate clears the top of the two metal stops permitting the tie rod to move either left or right. Springs attached to the steering release mechanism hold the steering plate in position above the level of the two metal stops. When the steering plate is fully raised, it may rest on either of the two metal stops. The movement of the tie rod is controlled by the movement of the pickup truck. As the pickup truck begins a right turn, for example, the momentum of the turn causes the tie rod to move right and pivot the wheels to the left so that the right turn can be completed and the truck frame extension will smoothly follow the path of the pickup truck. When the turn is completed the actuator control sends a signal to the actuator which decompresses the piston allowing the steering plate to rest on the tie rod between the two metal stops. Springs attached to the steering plate hold the steering plate securely against the tie rod, thereby preventing unwanted movement of the tie rod and wheels during straight line movement. For a left turn the process is the same. The status lights on the actuator control advise the driver of the pickup truck as to the orientation of the wheels on the truck frame extension.

BRIEF DESCRIPTION OF THE DRAWING FIGURES

A better understanding of the invention disclosed herein may be had by examination of the drawing/figures attached hereto.

DETAILED DESCRIPTION OF THE INVENTION

Figure 1A:
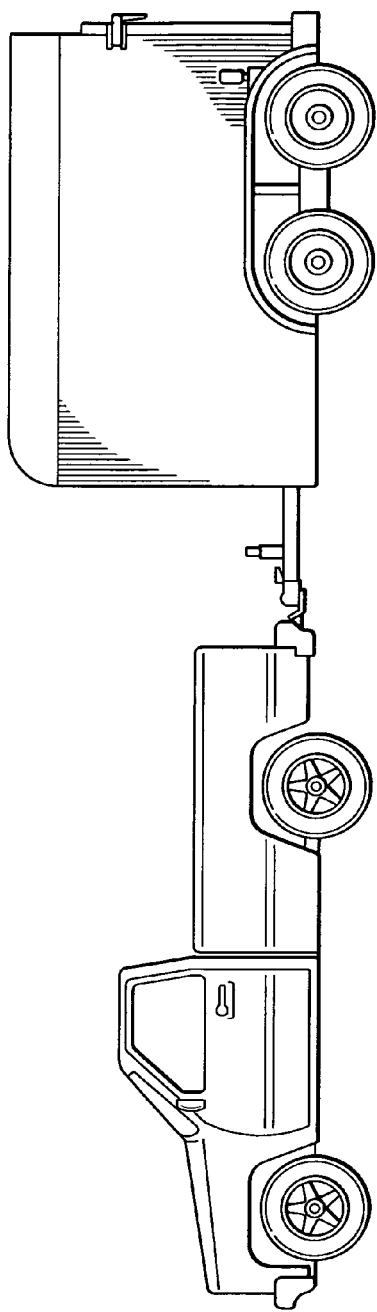
FIG. 1a shows the prior art hitch arrangement of connecting a trailer with a pickup truck.
Figure 1B:
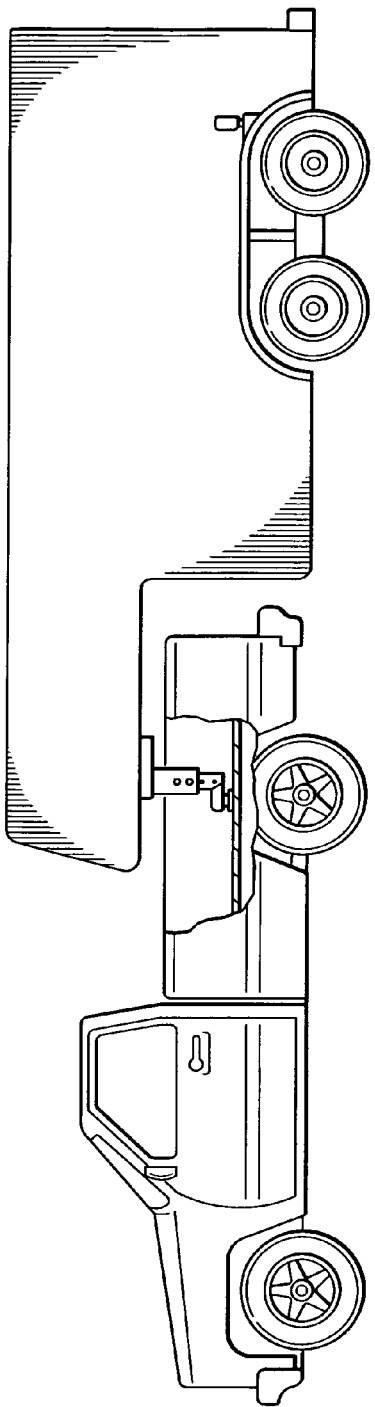
FIG. 1b shows the prior art hitch arrangement of connecting a gooseneck trail with a pickup truck.
Figure 2:
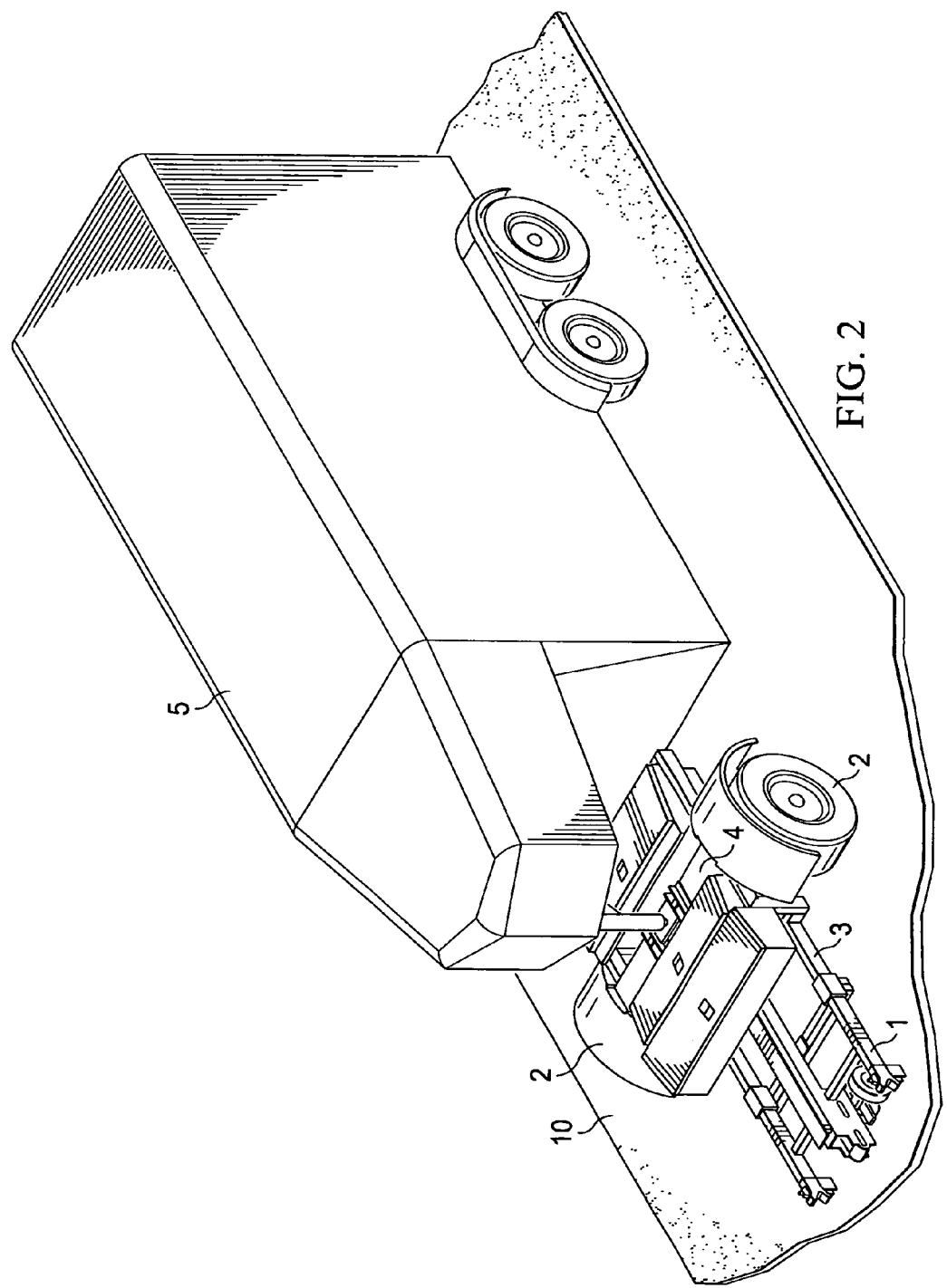
FIG. 2 shows a gooseneck trailer connected to the truck frame extension which in turn is connected to a pickup truck.

The invention disclosed herein is an apparatus to enhance turning, maneuvering, controlling and braking of gooseneck trailers pulled by pickup trucks and other vehicles. As shown in FIG. 2 one embodiment of the invention consists of a truck frame extension 10 connected to a pickup truck by attachment arms 1. The truck frame extension 10 also consists of a frame 3 and two wheels 2 positioned on opposite sides of the truck frame extension 10. Optionally, a standard braking system may be attached to the truck frame extension 10 to allow the truck frame extension 10 to assist with slowing the gooseneck trailer 5. The gooseneck trailer 5 is connected to the truck frame extension 10 by a hitch plate 4 located at the top of the truck frame extension 10. The two wheels 2 pivot in the direction opposite of the turn when released by a steering locking mechanism (not shown) which is controlled by an actuator control activated by the driver in the cab of the pickup.

Figure 3:
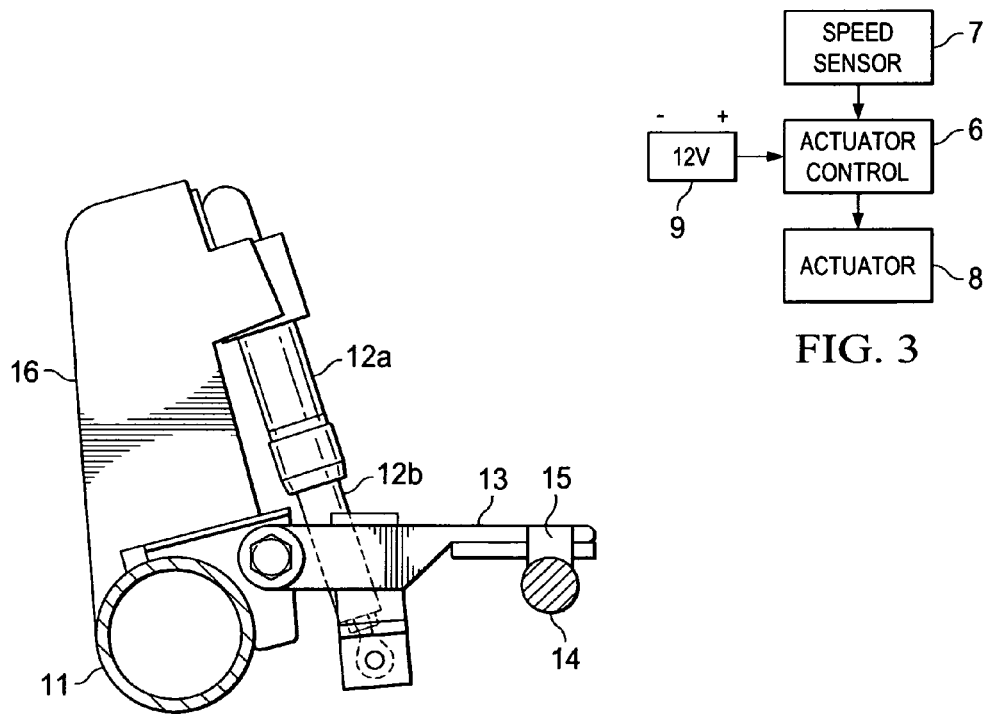
FIG. 3 is a schematic showing the components of the arrangement of the turn signal lights, actuator control and actuator powered by a 12 volt battery.

As mentioned above, the locking and release of the truck frame extension wheels 2 are controlled by an actuator control which is attached to an actuator 8, governed by turn signal lights and powered by a 12 volt battery 9 as shown by the schematic in FIG. 3. The actuator control 6 is connected to the turn signal lights of the pickup truck through which the driver of the pickup truck can control the actuator 8 through the actuator control 6. When the driver moves the turn signal lever to indicate a right turn or left turn, the actuator control 6 senses the change after 7 or 8 flashes of the turn signal lights and sends a signal to the actuator 8 to unlock the wheels 2 for a turn. When the actuator 8 unlocks the wheels 2 prior to a turn, the wheels 2 pivot in the direction opposite to the pickup's turn. The actuator control 6 is connected to the actuator 8 by electrical wire. The actuator 8 connects by electric wire through the standard 7 pin electrical connection located by the hitch receiver on back of the pickup truck. The steering release mechanism enables the driver of the pickup to make smoother, more efficient turns of a tighter radius. When the steering release mechanism is released, the wheels 2 pivot in the opposite direction of the turn allowing the trailer to swing more to the outside of the turn. As the turn progresses, the momentum of the pickup truck causes the wheels 2 to pivot in the direction of the turn decreasing the radius of the turn, enabling the driver of the pickup to avoid swinging out into another lane of traffic to ensure that the trailer completes the turn without hitting anything at the inside corner of the turn.

Figure 4A:
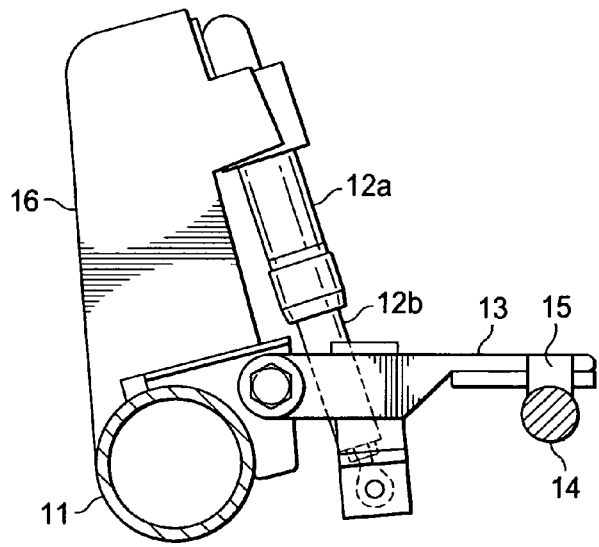
FIG. 4A is a side view of the steering release mechanism in which the wheels are locked for straight line movement.
Figure 4B:
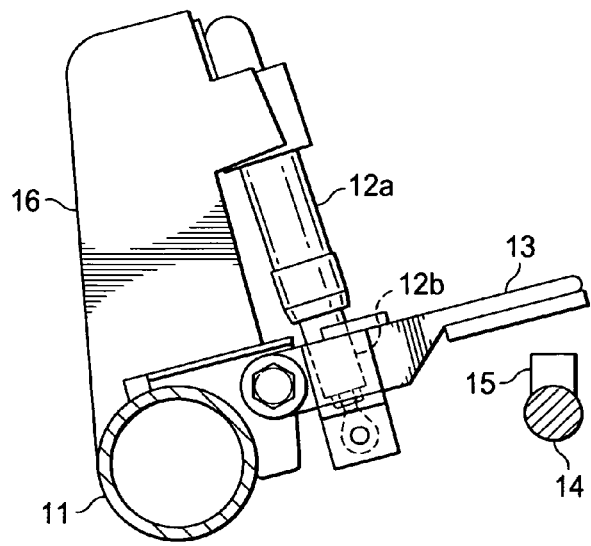
FIG. 4B is a side view of the steering release mechanism in which the steering plate is elevated above the tie rod permitting the truck frame extension wheels to pivot during a turn.

The steering release mechanism less the actuator is shown in FIGS. 4a, and 4b. The piston mounting bracket 16 is attached to the truck frame extension axle 11. The piston housing 12a and piston 12b are attached to the front side of the piston mounting bracket 16. The piston 12b extends downward from the piston housing 12a and is connected to the steering control plate 13 which in FIG. 4A is resting on the tie rod 14 between two metal stop blocks 15. In this configuration the tie rod 14 is prevented from moving and wheels are locked into position for straight line movement. FIG. 4b shows the configuration of the steering control assembly when the driver of the pickup has signaled that a turn is to be made. After 7 or 8 flashes of the turn signal lights, the actuator compresses the piston 12b into the piston housing 12a which lifts the steering control plate 13 off of the tie rod 14 and above the metal stop blocks 15. In this configuration the tie rod 14 is free to move and the wheels are able to pivot in such a manner as to smoothly complete the turn. In another embodiment of the invention disclosed herein the piston is replaced by a worm drive or other mechanism which is activated by the actuator and raises and lowers the steering control plate as desired by the driver.

Figure 5:
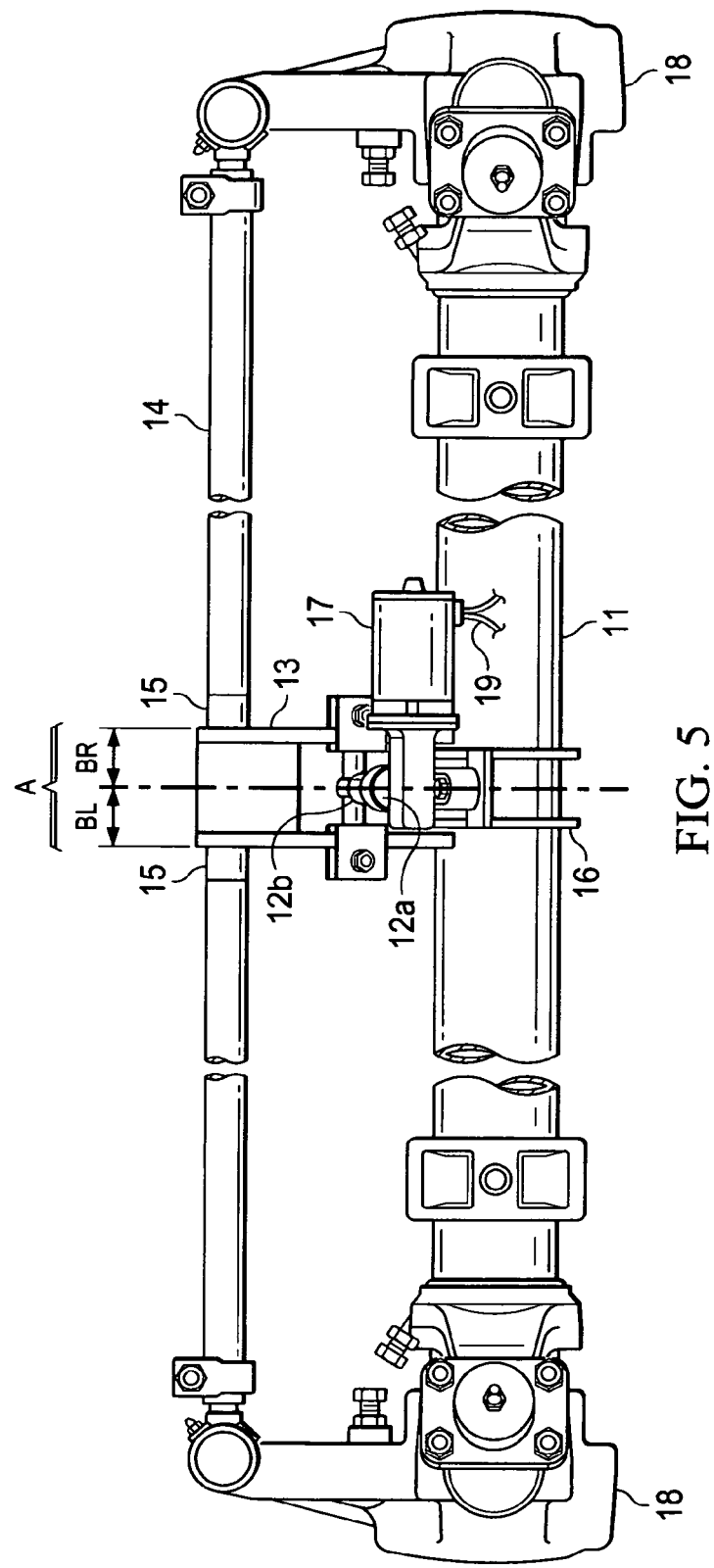
FIG. 5 is a top view of the steering release mechanism attached to the axle of the truck frame extension and orientation of the steering plate in relation to the tie rod.

FIG. 5 shows the arrangement of the steering release assembly from a top view. The piston mounting bracket 16 is attached to the truck frame extension axle 11. On the front side of the piston mounting bracket 16 is attached the piston housing 12a which contains the piston 12b. The actuator 19 which moves the piston 12b is attached to the side of the piston mounting bracket 16 and connected by electrical wire 19 to the actuator control in the cab of the pickup. The piston 12b is connected to the proximal end of the steering control plate 13 and the distal end of the steering control plate 13 rests on the tie rod 14 between the two metal stops 15. On each end of the axle 11 and tie rod 14 is connected the wheel hubs 18. The steering control plate acts as a lever which when the lever is pushed downward by the piston, worm drive or other mechanism causes the steering control plate 13 to be lowered onto the tie rod 14 in a position so that as the turn is completed the tie rod 14 will return to a position for straight line travel and steering control plate 13 will be spring loaded and positioned between the two metal stop blocks 15 locking the wheels 2 of the truck frame extension 10 in place for straight line travel. Conversely, when the piston, worm drive or other mechanism is retracted/raised, it causes the steering control plate 13 to rise above the metal stop blocks 15 on the tie rod 14 releasing the wheels 2 of the truck frame extension to pivot in accordance with the turn.

Figure 6A:
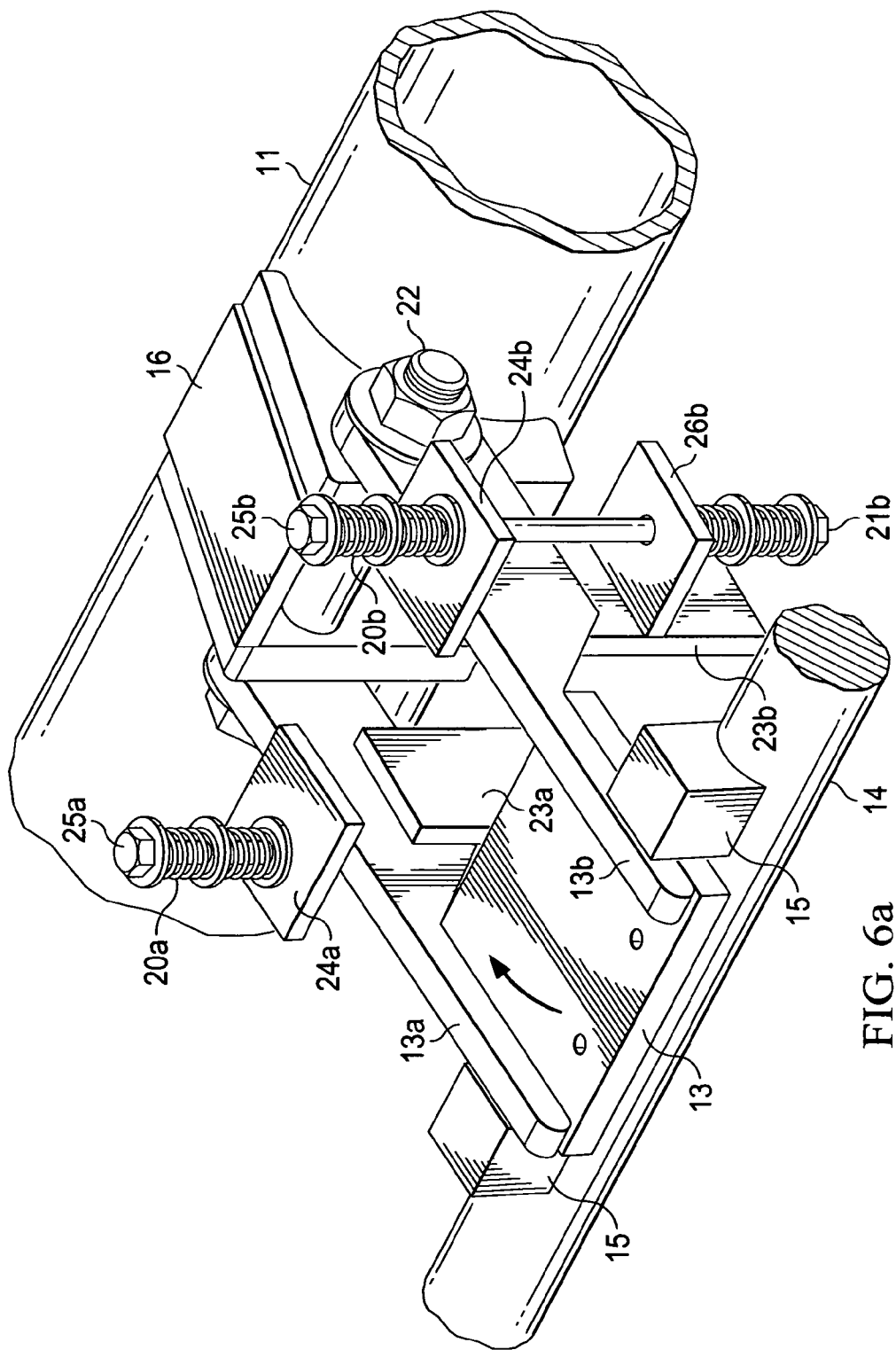
FIG. 6A is a side oblique perspective of the steering release mechanism attached to the truck frame extension axle and the steering plate resting on the tie rod between the two metal stops for straight line movement.
Figure 6B:
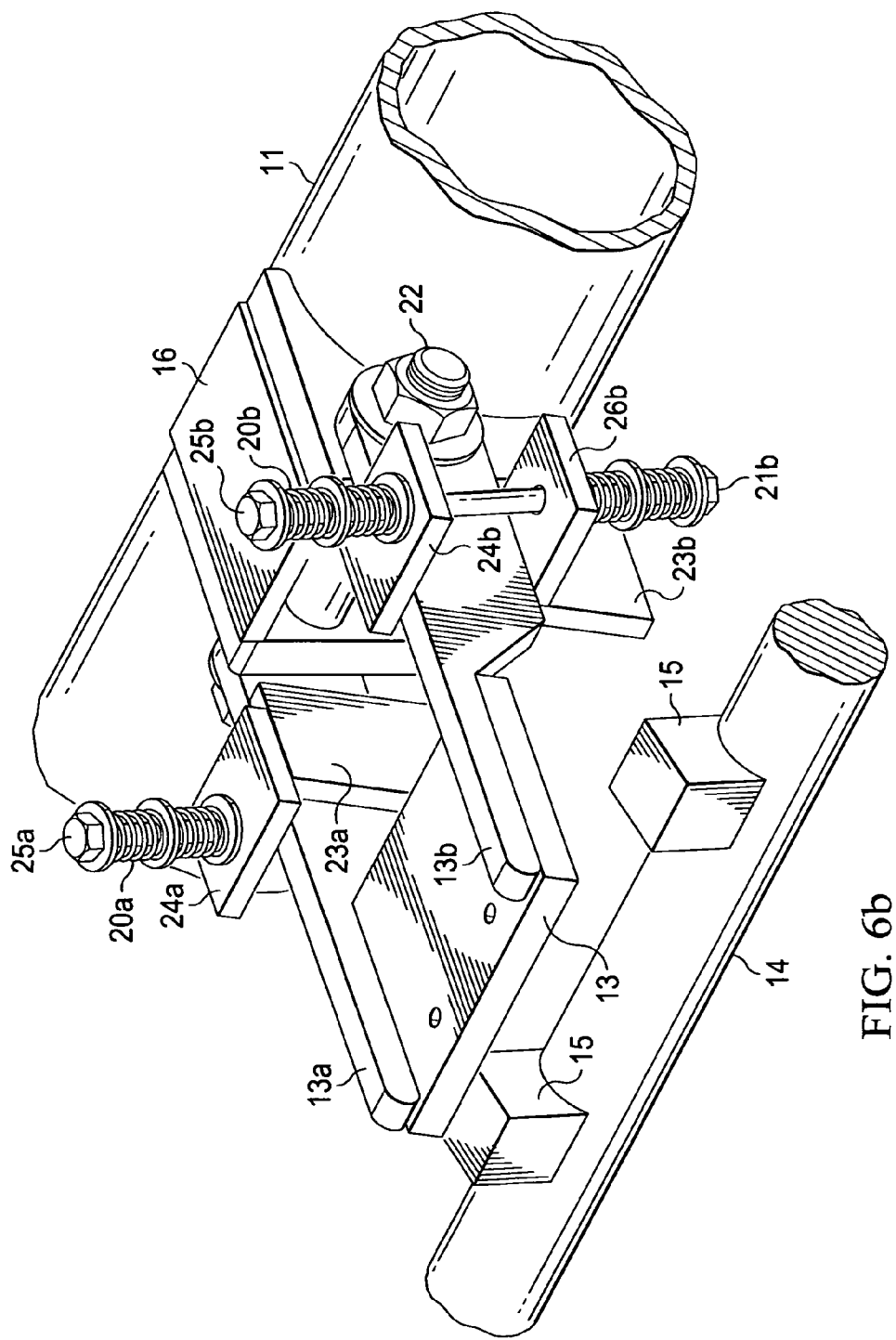
FIG. 6B is a side oblique perspective of the steering release mechanism attached to the truck frame extension axle and the steering plate elevated above the tie rod and two metal stops during a turn.

Another view of the operation of the steering release mechanism is shown in FIGS. 6A and 6b. Again, the piston mounting bracket 16 is attached to the truck frame extension axle 11. The steering control plate 13 is attached to the piston mounting bracket 16 by bolt 22. The steering control plate 13 has connected to it two parallel members 13a, 13b which extend from the distal end of the steering control plate 13 to the position on the piston mounting bracket 16 where the steering control plate 13 is connected to the piston mounting bracket 16 by a bolt 22. A top spring housing 24a and 24b is attached to the top of each parallel member 13a and 13b at a right angle to the parallel member 13a, 13b and are mirror images of each other. Also attached to the two parallel members 13a and 13b are downward extending members 23a and 23b. Attached to each of the two downward extending members 23a and 23b at a right angle and extending outward from the two downward extending members 23a and 23b are bottom spring housings 26a (not shown) and 26b. Top springs 20a and 20b are attached to each of the top spring housings 24a and 24b. Likewise, bottom springs 21a (not shown) and 21b are attached to each of the bottom spring housings 26a (not shown) and 26b. The top springs 20a, 20b are connected to the bottom springs 21a and 21b by bolts 25a and 25b. FIG. 6A shows the steering release mechanism in locked mode for straight line travel. The steering control plate 13 rests on the tie rod 14 between the two metal stop blocks 15 to prevent movement of the tie rod 14 and unwanted pivoting of the wheels 2. In the "locked" configuration as shown in FIG. 6a, the actuator (not shown) extends the piston (not shown) from the piston housing (not shown) positioning the steering control plate 13 in the locked position on the tie rod 14. When the steering control plate 13 is resting on the tie rod 14, the top springs 20a, 20b are decompressed and the biasing action of the two top springs 20a, 20b hold the steering control plate 13 firmly against the tie rod 14. In this "locked" configuration the bottom springs 21a and 21b are near neutral in compression. In this manner the steering control plate 13 is held firmly against the tie rod 14 preventing unwanted pivoting of the tires 2 during travel over bumpy or uneven surfaces.

When the driver in the pickup signals a turn as shown in FIG. 6B, after 7 or 8 flashes of the turn signal lights, the actuator raises the piston 12b upward causing the steering control plate 13 to elevate from the tie rod 14 and above the level of the two metal stop blocks 15 allowing the tie rod 14 to move so that the wheels 2 can pivot to accomplish the turn that the driver has selected. The steering control plate 13 is pushed above the level of the metal stop blocks 15 and the tie rod 14 by the bottom springs 21a, 21b and retracted piston 12b. When the steering control plate 13 is lifted above the level of the metal stop blocks 15, the steering control plate 13 is held above the level of the metal stop blocks 15 by the biasing action of the relaxed bottom springs 21a, 21b. When the turn signal returns to the neutral position during the turn the steering control plate 13 rests on the two metal stop blocks 15. As soon as the tie rod 14 returns to the centered position, the compressed top springs 20a, 20b force the steering control plate 13 to snap down on the tie rod 14 between the metal stop blocks 15.

Figure 7A:
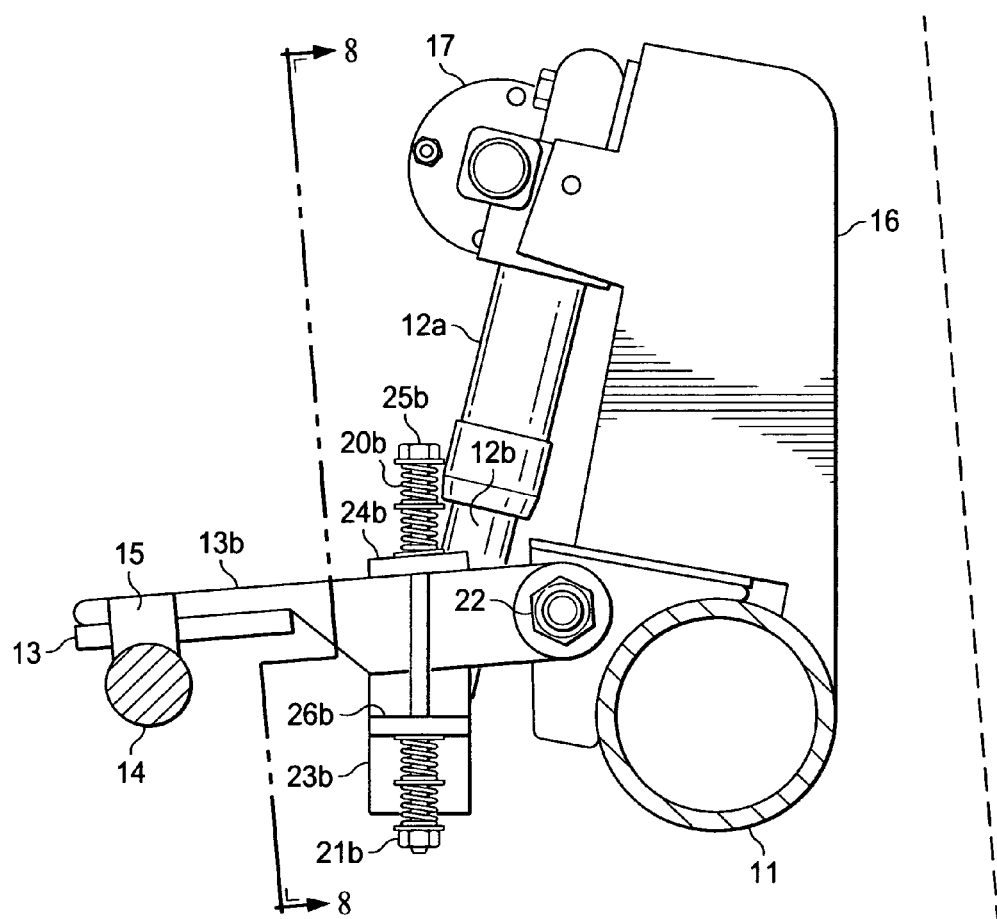
FIG. 7A is a side view of the steering release mechanism attached to the truck frame extension showing the bias springs in orientation with the steering plate when the plate is resting on the tie rod between the two metal stops during straight line movement.
Figure 7B:
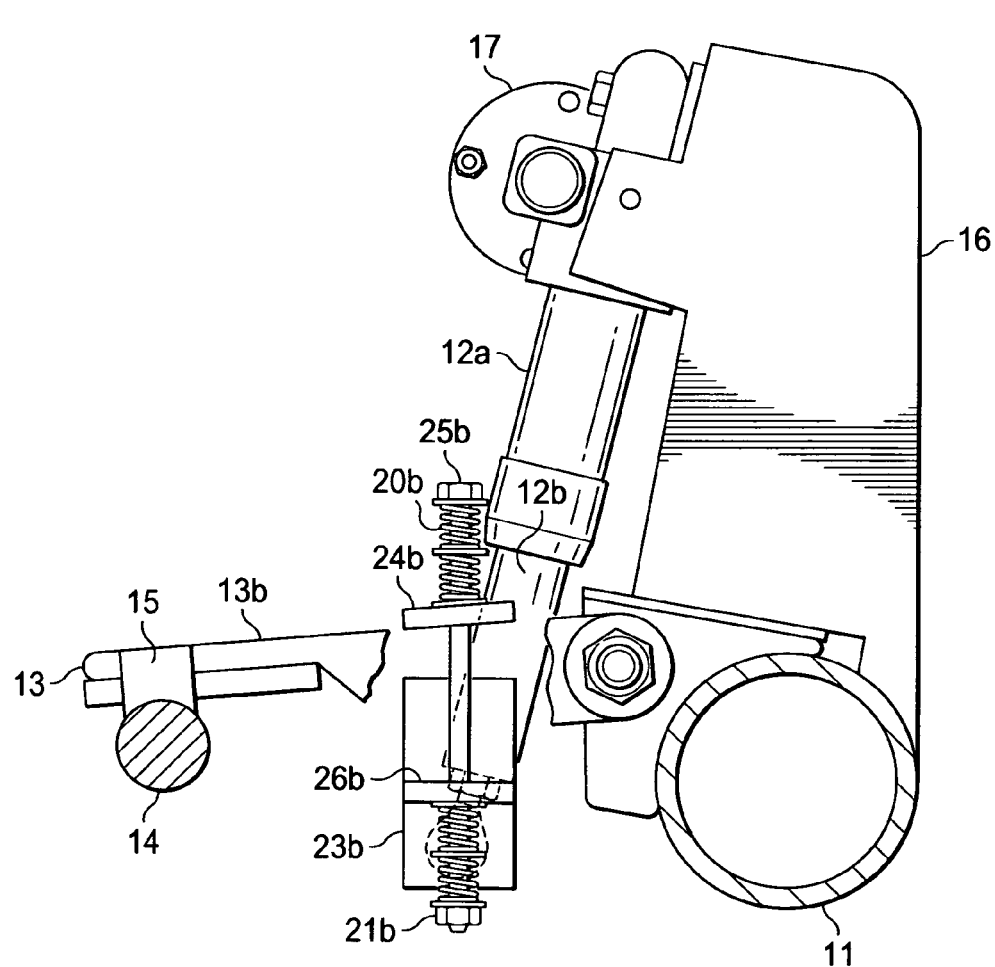
FIG. 7B is a side view of the steering release mechanism attached to the truck frame extension axle showing the bias springs in orientation with the steering plate and hydraulic piston when the steering plate is resting on the tie rod between the two metal stops during straight line movement.

Another view of the arrangement and operation of the steering release mechanism is shown in FIGS. 7A. 7B and 7C. The piston mounting bracket 16 is connected to the truck frame extension axel 11 and the piston housing 12a. Inside the piston housing 12a is the piston 12b which drives the steering control plate 13 up and down as determined by the driver. The piston 12b is connected to the steering plate 13 by a bolt which extends from one downward extending member 23a to the other downward extending member 23b. The actuator 17 is attached to the piston mounting bracket 16 and controls the movement of the piston 12b. In view 7A, the steering control plate 13 is resting on the tie rod 14, between the two metal stop blocks 15, which prevents the tie rod 14 from moving, holding the wheels in place for straight line travel. The steering control plate 13 is connected to the piston mounting bracket 16 by a bolt 22 which extends through the two lateral members 13b, 13a (not shown). Top and bottom springs 20b and 21b are attached to spring housings 24b and 26b by bolts 25b and 21b. The upper spring 20b decompresses when the steering control plate 13 as it is positioned on the tie rod 14 between the two metal stop blocks 15 which holds the steering control plate 13 in place for straight line travel. The bottom spring 21b is in near neutral compression when the steering control plate 13 is in place for straight line travel. FIG. 7B shows the same view of the steering locking mechanism with the exception that downward extending member 23b is shown in a cutaway view to facilitate examination of the connection between the piston 12a and the downward extending members 23a (not shown) and 23b. FIG. 7B shows the steering release mechanism in the locked position with the steering control plate 13 resting on the tie rod 14 between the two metal stop blocks 15.

Figure 7C:
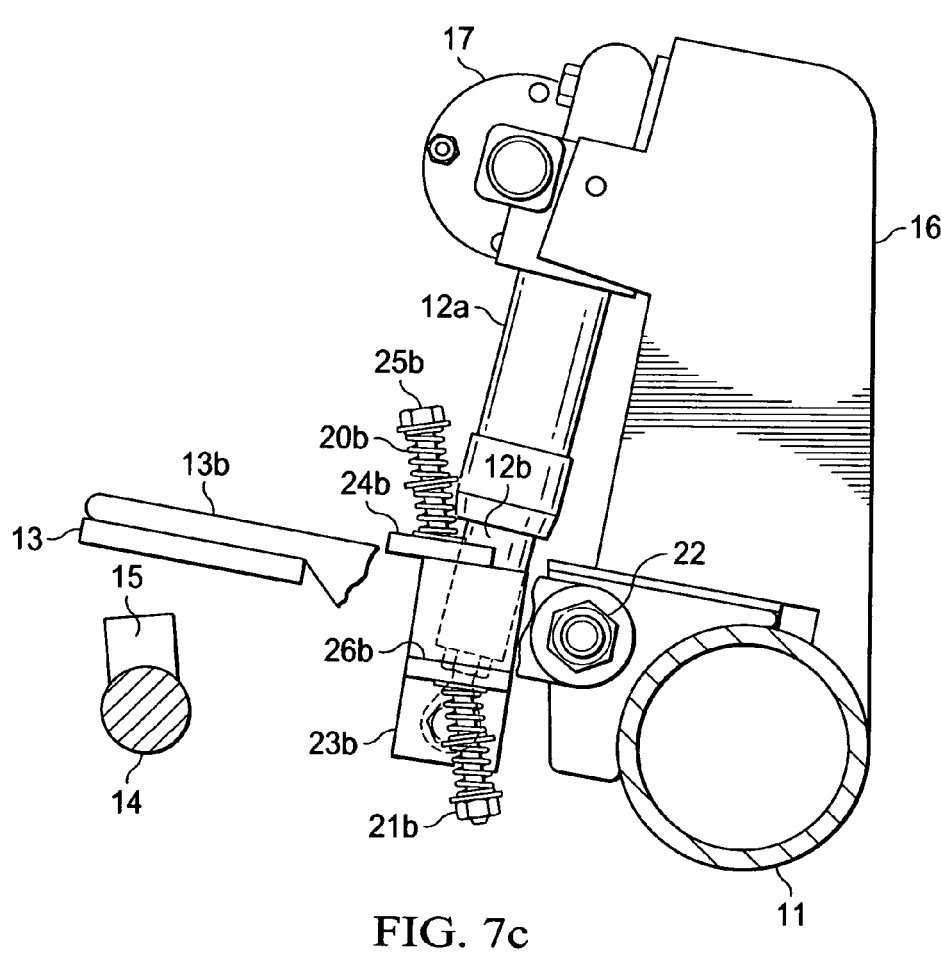
FIG. 7C is a side view of the steering release mechanism attached to the dolly axle showing the bias springs in orientation with the steering plate and hydraulic piston when the steering plate is elevated above the tie rod and two metal stops during a turn.

FIG. 7C shows the configuration of the steering release mechanism when the piston 12b is compressed into the piston housing 12a lifting the steering control plate 13 from the tie rod 14 and above the level of the metal stop blocks 15. The upper spring 20b is compressed and the lower spring 23b is relaxed holding the steering control plate 13 above the level of the metal stop blocks 15 along with the compressed piston 12b.

Figure 8:
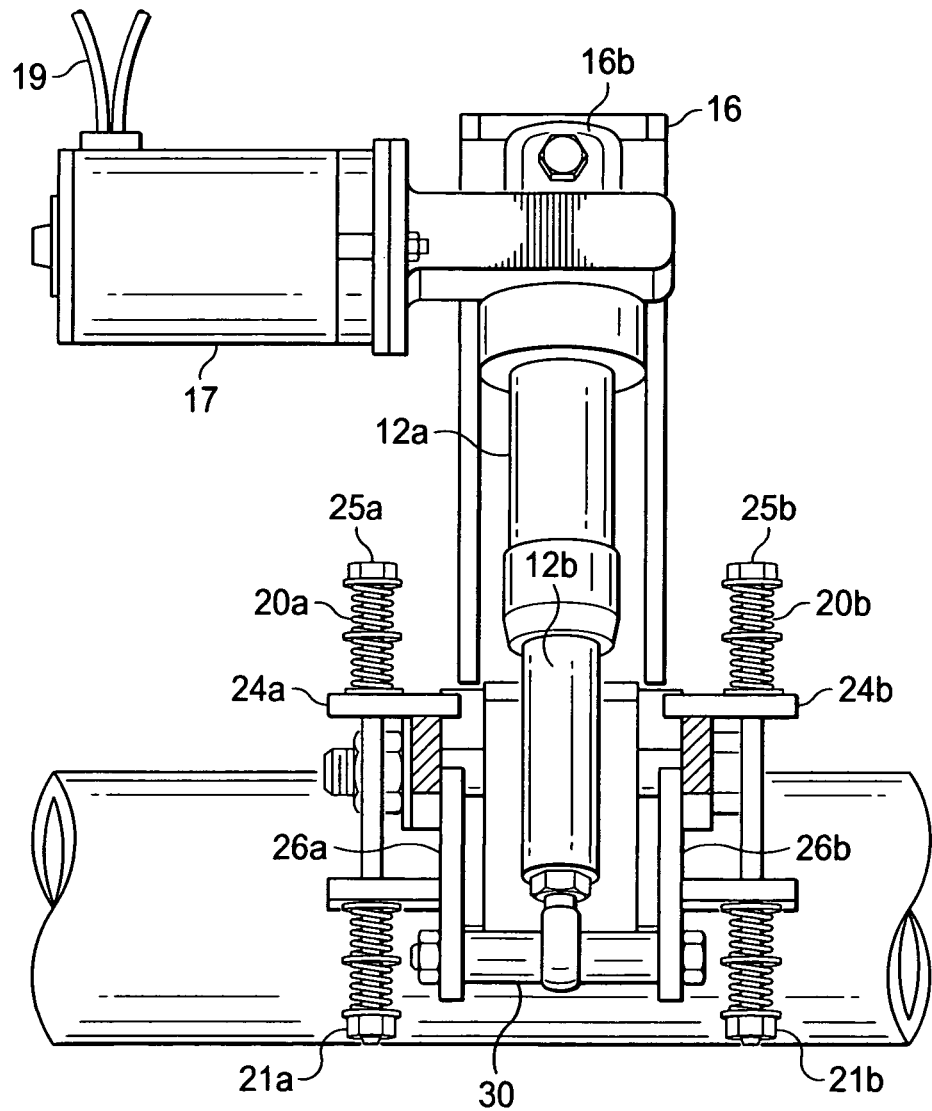
FIG. 8 is a top view of the steering release mechanism showing the arrangement of the actuator, piston, bias springs and steering plate.

FIG. 8 demonstrates yet another view of the steering release mechanism disclosed herein. The piston mounting bracket 16 is connected to the axle 11 (not shown). Connected to the piston mounting bracket 16 is the actuator 17 which is connected to the actuator control by electrical wire 19. The piston housing 12a with the piston 12b inside the piston housing 12a is connected to the piston mounting bracket 16 by a bolt 16b. The piston 12b is connected to the downward extending members 26a and 26b by a bolt 30. A pair of upper springs 20a, 20b is connected to spring housings 23a, 23b, while the pair of lower springs 21a and 21b are connected to lower spring housings 26a and 26b.

Figure 9:
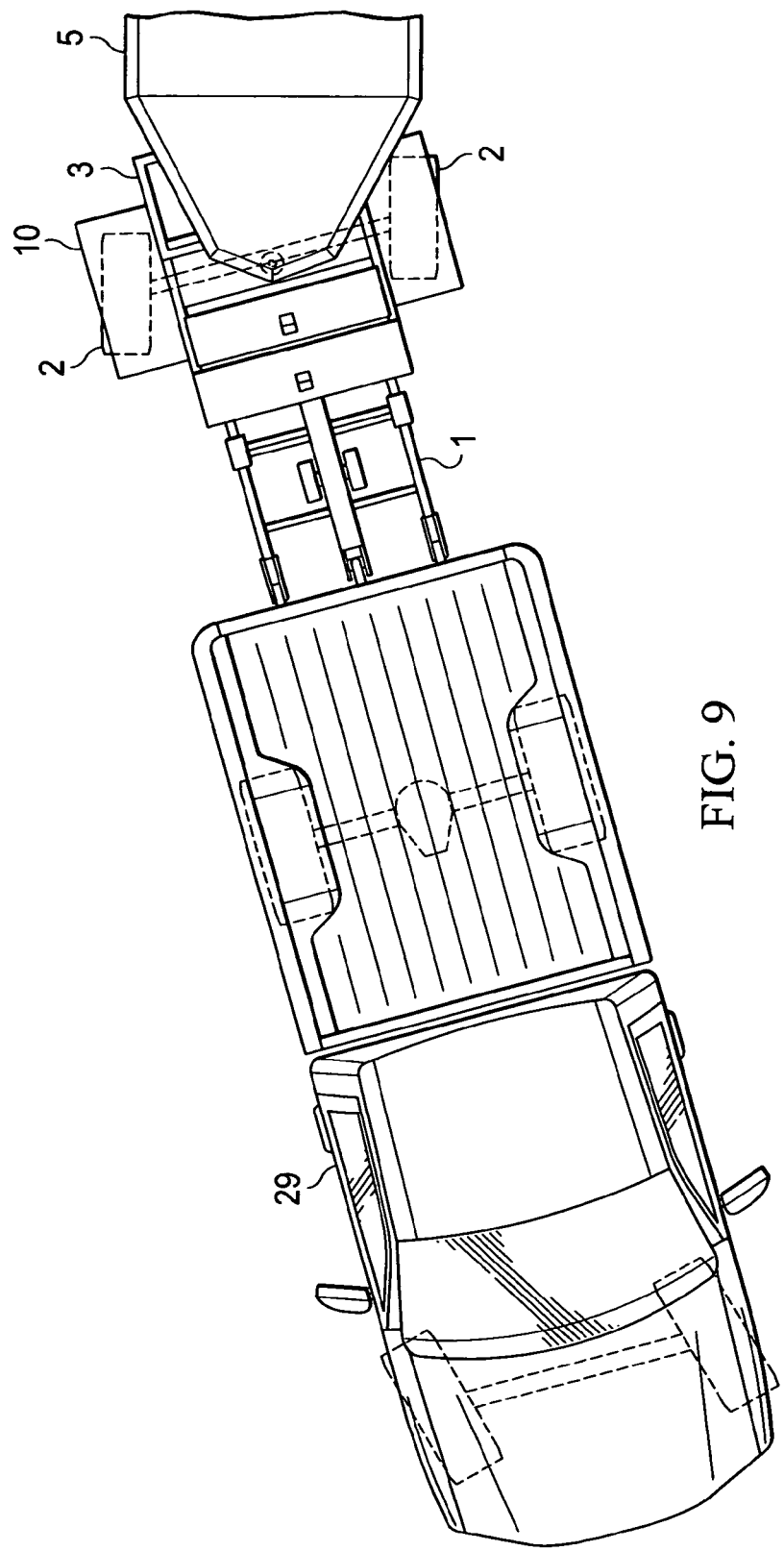
FIG. 9 is a top view showing the orientation of the gooseneck trailer and truck frame extension during a left-hand turn.

FIG. 9 shows the connection of a trailer 5 to the truck frame extension 10 and the connection of the truck frame extension 10 by way of connecting arms 1 to a pickup truck 29. When the driver of the pickup truck starts a left-hand turn and signals a left hand turn which is sensed by the actuator control which instructs the steering release mechanism to lift the steering control plate from the tie rod so that the tie rod can move and the truck frame extension tires are free to pivot to the right due to the momentum of the trucks turn. As the turn is performed the truck frame extension tires pivot in the direction that the truck is turning to complete the turn. When the turn is completed and the turn signal light has extinguished the tie rod moves to position for straight line traffic, the piston is extended to allow the steering control plate to fall into the gap between the two metal stop blocks locking the wheels of the truck frame extension for straight line travel. The benefit of this arrangement is to shorten the turning radius making the turn more efficient and safe. Another benefit of the steering mechanism disclosed herein is that the pickup truck does not have to swing out wide into other lanes of traffic to ensure that the trailer makes the turn without hitting any obstacles.

The steering release mechanism described in this specification can be constructed in many sizes to accommodate different size trailers. Further, the steering release mechanism could include a plurality of tires which would be able to tow more weight in the trailer. Additionally, the piston of the steering release mechanism could be replaced by a worm drive or any other mechanism which could elevate or depress a lever to raise or lower the steering control plate as desired. There are many other configurations which are not specifically disclosed but which would be obvious to a person of ordinary skill in the art and are specifically included in this specification.

I claim:

1. A truck frame extension designed to connect a goose neck trailer to a towing vehicle comprising:
   a frame substantially rectangular in shape;
   an axle connected in a perpendicular orientation to the long axis of said frame;
   a wheel connected at each end of said axle;
   a tie rod pivotably attached and extending between two said wheels;
   a first hitch mechanism connecting said frame to said towing vehicle;
   a second hitch mechanism connecting said gooseneck trailer to said truck frame extension;
   an axle steering mechanism connected to said axle, said tie rod and said frame comprising:
   an actuator control mechanism,
   an actuator connected electrically to the said actuator control mechanism;
   a piston connected to said actuator;
   a steering control plate attached to said piston;
   a plurality of downward biasing springs attached by threadable fasteners to the upper side of said steering control plate;
   a plurality of upward biasing springs attached by threadable fasteners to the underside of said steering control plate;
   a tie rod with two metal stop blocks positioned to permit said steering control plate to rest on said tie rod between said metal stop blocks;
   whereby when said actuator compresses said piston, said steering control plate is raised above the level of said metal stops permitting the tie rod to pivot in accordance with said towing vehicle's momentum allowing said tires on said truck frame extension to pivot in a direction opposite the direction of turn of said towing vehicle.

2. A steering control mechanism attached to a truck frame extension allowing increase maneuverability of a gooseneck trailer attached to said truck frame extension and towed by a towing vehicle comprising:
   an actuator control mechanism;
   an actuator connected electrically to the said actuator control mechanism;
   a piston connected to said actuator;
   a steering control plate attached to said piston;
   a plurality of downward biasing springs attached by threadable fasteners to the upper side of said steering control plate;
   a plurality of upward biasing springs attached by threadable fasteners to the underside of said steering control plate;
   a tie rod with two metal stop blocks positioned to permit said steering control plate to rest on said tie rod between said metal stop blocks;
   whereby when said actuator compresses said piston, said steering control plate is raised above the level of said metal stops permitting the tie rod to pivot in accordance with said towing vehicle's momentum allowing said tires on said truck frame extension to pivot in a direction opposite the direction of turn of said towing vehicle.

* * * * *